US011373446B1

(12) United States Patent
Beisel et al.

(10) Patent No.: US 11,373,446 B1
(45) Date of Patent: Jun. 28, 2022

(54) INTERACTIVE MEDIA FACIAL EMOTION-BASED CONTENT SELECTION SYSTEM

(71) Applicant: Amazon Technologies, Inc., Seattle, WA (US)

(72) Inventors: Brian William Beisel, Brooklyn, NY (US); Nicholas Ryan Miller, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 16/396,419

(22) Filed: Apr. 26, 2019

(51) Int. Cl.
*G06V 40/00* (2022.01)
*G06V 40/16* (2022.01)
*G10L 25/90* (2013.01)
*G10L 25/63* (2013.01)

(52) U.S. Cl.
CPC ............ *G06V 40/174* (2022.01); *G10L 25/63* (2013.01); *G10L 25/90* (2013.01)

(58) Field of Classification Search
CPC ....... G06K 9/00302; G10L 25/63; G10L 25/90
See application file for complete search history.

(56) References Cited

U.S. PATENT DOCUMENTS

| 2017/0041272 | A1* | 2/2017 | Chang | G06F 3/0488 |
| 2018/0047391 | A1* | 2/2018 | Baik | G10L 15/1815 |
| 2019/0188459 | A1* | 6/2019 | Ahn | G06F 3/04817 |
| 2020/0139077 | A1* | 5/2020 | Biradar | G06K 9/00302 |

* cited by examiner

*Primary Examiner* — Pakee Fang
(74) *Attorney, Agent, or Firm* — Eversheds Sutherland (US) LLP

(57) ABSTRACT

Devices and methods are provided for using an interactive media to select content based on a user emotion. The device may receive user data associated with presentation of first content at a first time. The device may determine, based on the user data, a first emotion state of a user. The device may determine a target emotion state for the user at a second time. The device may determine a difference between the first emotion state and the target emotion state. The device may determine, based on the difference, a function associated with content determination. The device may determine, based on the function, second content for presentation to the user.

20 Claims, 7 Drawing Sheets

INTERACTIVE MEDIA FACIAL EMOTION-BASED CONTENT SELECTION SYSTEM

BACKGROUND

When presenting content to a user, a content provider or other party may intend to influence a viewer's reaction to the content. For example, a content provider may want a user to be scared when the user watches a scary movie. However, computer-based selection of content for presentation to one or more users may not account for the significance of a user changing from one particular emotional state to another, and for an amount of time during which to cause a particular emotional reaction from a user.

Figure 1:
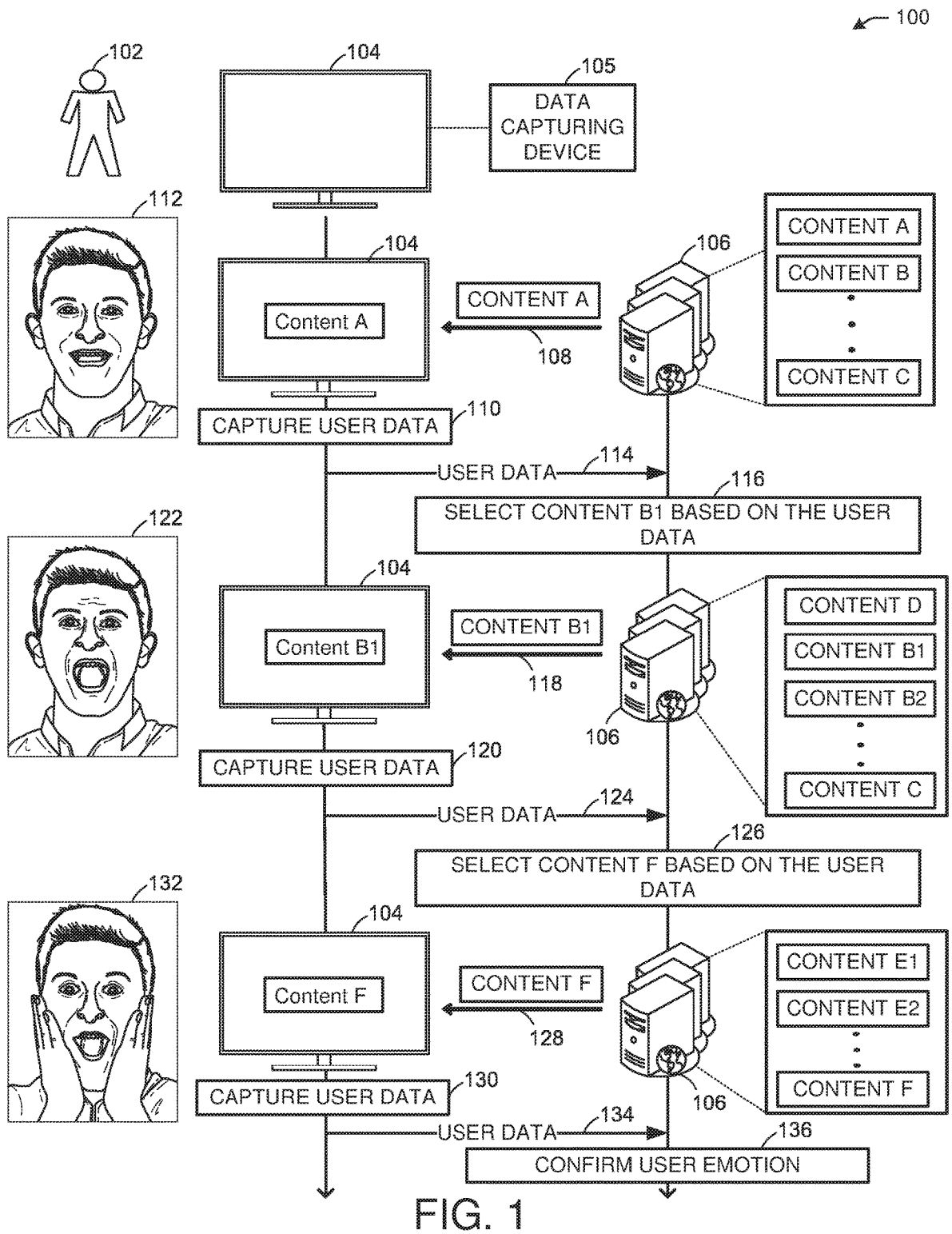
FIG. 1 illustrates an example process for using an interactive media emotion-based content system, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for emotion-based content selection.

Content providers may want to cause user emotions and reactions to certain types of content, and may measure a consumer's reaction to the content to determine whether the content is having an intended effect. For example, when a user is playing a game or watching video, if the content is intended to cause a user to laugh, a content provider may analyze a user's actions and expressions to determine if the presented content caused the user to laugh.

A system may select or customize content for presentation based on a reaction that the content is intended to evoke. For example, if a content provider intends to scare a user playing a game, the system may select content known to be scary, such as monsters or zombies, or may present video or audio (e.g., dark colors, scary sounds, or the like) to present in the game to the user. The system may have multiple types and options of content (e.g., media artifacts), such as video frames, audio, video objects, images, and other content, and may select content or presentation based on a reaction that a content provider or another party intends to cause a user to express. The system may modify content based on a target or desired emotion to cause. For example, additional zombies may be added to an existing scene, or the tone or pitch of audio may be adjusted without causing an interruption to the presentation of the content.

Some systems may present content to users to cause a particular reaction. For example, a system may play a loud sound to get a user's attention. However, some systems do not account for a user's current emotional state and how significant the transition from the user's current emotional state to a target emotional state at a given time may be.

Therefore, the selection and customization of content to present to one or more users may be improved by accounting for a user's emotional state, a desired change to the user's emotional state, and a time limit to cause the transition from the user's emotional state to the target emotional state.

In one or more embodiments, in accordance with relevant privacy and other laws and regulations, and with the permission of a user, a system may capture and receive user data indicative of a user's emotional state. For example, a system may use cameras, microphones, heartrate monitors, biometric sensors, other data capturing devices, and inputs provided by users to analyze and identify a user's emotional state at a given time. For example, if a camera captures images of a user (e.g., video or still-frames), the system may perform image recognition techniques to identify facial features, objects, body positions, and other data which may be used to indicate a user's emotional state. Image analysis techniques may identify whether a user is smiling, frowning, laughing, talking, or performing an action indicative of an emotion. Image analysis techniques may identify whether a user is looking in the direction of the device presenting content, whether a user is sitting or standing, whether a user's arms or hands are in a given position (e.g., raised in the air, covering a portion of the user's face, high-fiving another user, etc.). Heartrate monitors may measure a user's heartrate to determine whether a user is scared, excited, bored, or another emotion (e.g., a higher heartrate may indicate an excited or scared user). Biometric sensors may capture fingerprints, face recognition, blood flow, retinal data, voice data, scents, and other data which may be used to identify, individually or combination with other data, a user's emotional state.

In one or more embodiments, a system may analyze the reactions of users to presented content, and may store data indicating which content is associated with causing certain emotions, how often, how long it takes a user to transition from one emotion to another emotion, and other data. Emotional state data may be captured and indexed for an individual user and for multiple groups of users. For example, any individual may have an emotional profile stored and updated by a system based on the system's determination of emotions expressed by a user in response to different types and amounts of content. Emotional data may be stored and updated by a system to capture a general population and sub-populations (e.g., based on geography, demographics, etc.). The system may use emotional state profiles to determine content likely to produce an emotional state given a user's individual emotional state data and/or emotional state data of a group of users.

In one or more embodiments, content providers may provide a system with content and timing information. The timing information may indicate times during presentation of content to cause an emotional state of one or more users. For example, the timing information may indicate that the content provider or another party intends to cause a user to be surprised at a first time (e.g., a target emotion state), happy at a second time, and scared at a third time. The system may determine, based on a user's current emotion state, which content and/or what version or scale of the content to provide in order to evoke the target emotional state.

In one or more embodiments, the content to be presented at a given time may be predetermined (e.g., a scene in a movie), but content presented to an audience between a current time and a future time when a target emotion state for the audience to express in response to the predetermined content may be selected and/or customized to cause the audience to transition from a current emotional state to the target emotional state. For example, if a video scene is intended to cause a target emotion state of surprise, content may be selected and/or customized to result in the target emotion state when the predetermined content is presented. When content includes a video such as a movie or show, the scenes may be selected automatically or based on user inputs/selections, or the scenes may be preset, and the content in the scenes may be adjusted. For example, a set of movie scenes may not change, but the sound, color, lighting, captioning, or other content for the scenes may be adjusted to cause the target transition from a current emotion state to a target emotion state. A system may select and/or customize content to cause such a transition between emotion states.

In one or more embodiments, transitioning from a first emotional state to a second emotional state may take a different amount of time or may require different content than transitioning from a third emotional state to the second emotional state. For example, transitioning from happy to sad may be a more significant emotional transition than transitioning from angry to sad. Therefore, a system may select and/or customize content differently to cause an emotion based on the current emotional state of a user.

In one or more embodiments, given the timing information and the difference between a user's current or recent emotional state and a target emotional state, a system may select or customize content to cause a transition. For example, the timing information may indicate to the system a time delta (e.g., an amount of time) for a user to reach an emotional state. The system may analyze the user's current emotional state and the target emotional state at a subsequent time (e.g., based on the timing information), and may determine an emotional delta function. The emotional delta function may be a function measuring how significant an emotional transition from a user's current emotional state to a target emotional state may be given the amount of time to cause the target emotional state. For example, an emotional delta function may indicate that an emotional transition from a first emotional state to a second emotional state is significant given the changes which may be required to cause the user's emotion to transition. The system may measure the transition based on how different a facial expression indicative of the user's current emotion is from a facial expression indicative of a target emotion. The system may also determine whether a heartbeat, voice expression, body position, biometric data, or other data associated with a user is indicative of an emotional state, and may determine the difference between the data associated with a user's current emotional state and data associated with the target emotional state. Based on how significant the differences are, the emotional delta function may be used to determine how significant the changes may be given the time required to effect an emotional state change. For example, with less time to cause an emotional state change, the emotional delta function may indicate that a more significant change in content may be needed to cause the target emotional state change than when the system has more time to cause the target emotional state change.

In one or more embodiments, the system may determine, using the emotional delta function, whether the change from a user's current emotional state to a target emotional state may be linear, exponential, logarithmic, or according to another pace. For example, to cause a linear change, the system may select content which continuously causes a user to change emotional states. Such may include linearly increasing volume or changing pitch toward the desired volume or pitch, gradually adding characters over time, or other linear changes. To cause an exponential emotional state change, the system may select content which may slowly change a user's emotional state before rapidly changing the user's emotional state (or the reverse). For example, to cause a scared emotional state when a user is playing a game in which a character enters a forest, the system may introduce a creature or two for a time, then may introduce an increasing number of creatures (e.g., in an exponential fashion) so that the user may be slightly scared at first, and exponentially increasingly scared over time as more creatures are introduced to the game. Similarly, content may be introduced or modified in a logarithmic fashion to cause a logarithmic change in a user's emotional state.

In one or more embodiments, the system may identify content known to make a user or group of users exhibit an emotion (e.g., content which has produced a facial expression, heartrate, biometric output, or other user reaction) within a given amount of time from another emotional state, and may assign weights to the content. The weights may be heavier for content known to cause a reaction in a shorter or longer amount of time, or are known to cause a reaction to the user or a group of users having something in common with the user. The system may identify multiple candidate artifacts based on a target emotion, and may assign heavier weights to artifacts more likely to cause an emotion based on timing, a significance of a transition from one state to another, the user's past behavior, and the emotional delta function (e.g., to cause a linear, exponential, or logarithmic change).

In one or more embodiments, in an input state, a media creator may provide the system with a set of potentially usable artifacts for the next available rendered frame of content. The media creator also may provide the system with a target emotional profile that the system may use to attempt to cause the user to match (e.g., based on the user's reactions and expressions). Biometric feedback and other data may be provided to the system to determine the user's emotional state. The media artifacts previously selected by the system may be used to provide feedback on the performance of an artifact with respect to the artifact's success or failure in causing the target emotional state within a given time.

In one or more embodiments, in a processing state, the system may convert raw sensor data and other captured or input user data to a current user emotional profile using a selected facial machine learning system, which may include one or more neural networks and/or other machine learning devices and modules. Previously presented media artifacts may be paired with the change in emotional state and/or the current emotional state observed using received user data. The system may determine a delta between the current emotional state and target emotional state with respect to the delta function provided to the system (e.g., by the content provider) to determine the target emotional state that the next rendered frame is intended to cause. New tagged media artifacts may be selected and/or customized based on the updated artifact model and new target emotional state. The system may indicate to the media creators/providers which media artifacts were presented at given times and scenarios, and whether the presented media artifacts caused the target emotional state changes.

In one or more embodiments, emotion states may be representative of amounts and/or specific types of emotions. For example, a higher amount of fear may be measured by a user covering their face or screaming, whereas a lower amount of fear may be measured by a particular facial expression (e.g., a grimace or squint); a higher amount of sadness may be measured by tears, whereas a lower amount of sadness may be measured by a frown. Specific types of emotions may be targeted by presenting certain content. For example, a scared emotion state may include specific types of fearful expressions, such as a jump scare or a scream. A target emotion state may specify the specific type of emotion to express, or the specific type of action associated with an emotion to express.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for using an interactive media emotion-based content system, in accordance with one or more example embodiments of the present disclosure.

Referring to FIG. 1, the process 100 may include a user 102 watching, listening to, and/or interacting with content displayed on a device 104. The device 104 may have or be associated with a data capturing device 105, or the data capturing device 105 may be separate from the device 104. The device 104 may display content received from a remote network 106. At step 108, the remote network 106 may select and send content A to the device 104 for presentation to the user 102. Content A may be selected from among multiple available artifacts (e.g., content B . . . content C), which may be present content options to present at a given time, or may be content artifacts known to cause a target emotion state at a given time. At step 110, the data capturing device 105 may capture user data, such an image 112 of the user 102. The image 112 may include an image of the user's face, and may be an individual image or may be part of a video stream. At step 114, the device 104 may send user data (e.g., captured in step 110) to the remote network 106. The user data may include the image 112 and/or other data captured from the user, such as heartrate data (e.g., if the data capturing device 105 included a heartrate monitor) or biometric data (e.g., if the data capturing device 105 included one or more biometric sensors). At step 116, the remote network 106 may receive the captured user data and may select content (e.g., content B1) based on the user data. Content B1 may be selected because the remote network 106 determines that the user data indicates that the user 102 exhibited characteristics (e.g., a facial expression, heartbeat, and/or biometric data) known by the remote network 106 to be associated with an emotion (e.g., a happy facial expression in the image 112). Alternatively, the remote network 106 may select content B1 because the user's expression is not the intended expression or does not match an intended expression at a given time. Content B1 may be selected from among multiple artifacts (e.g., content D, content B2, . . . , content C), which may be known by the remote network 106 to cause an emotion state of the user 102, or may be preset content artifact options from which the remote network 106 may select content for presentation. In particular, content B1 and content B2 may represent different versions of the same content (e.g., different quantities of artifacts, different colors, different versions of the same audio, etc.).

Still referring to FIG. 1, at step 118, the remote network 106 may send content B1 to the device 104 for presentation to the user 102. At step 120, the data capturing device 105 may capture user data of the user 102 while the user 102 interacts with, watches, and/or listens to content B1. The captured user data may include an image 122 of the user's face during presentation of content B1. At step 124, the device 104 may send user data (e.g., captured in step 120) to the remote network 106. The user data may include the image 122 and/or other data captured from the user, such as heartrate data (e.g., if the data capturing device 105 included a heartrate monitor) or biometric data (e.g., if the data capturing device 105 included one or more biometric sensors). At step 126, the remote network 106 may select content F based on the user data. Content F may be selected from among multiple content artifacts (e.g., content E1, content E2, . . . , content F) known by the remote network 106 to cause a different expression of the user 102, or may be preset content artifacts from which the remote network may select content for presentation to cause a target emotion state. For example, content E1 and content E2 may represent different versions of the same content (e.g., different versions of the same audio, different quantities of the same content, different display options of the same scene, etc.), and content F may represent different content than content E1 and content E2 (e.g., a different scene with different playback parameters such as speed, color, or brightness, a different audio file, a different set of characters, etc.). At step 128, the remote network 106 may send content F to the device 104 for presentation to the user 102. At step 130, the data capturing device 105 may capture data of the user 102 as content F is presented using the device 104. The captured user data may include an image 132 of the user 102 (e.g., showing a facial expression), heartrate data, and/or biometric data of the user 102. At step 134, the device 104 may send the captured user data to the remote network 106, which may analyze the user data and may confirm, at step 136, that the user emotion expressed (e.g., in the image 132) matches a target emotion at a given time.

In one or more embodiments, in accordance with relevant privacy and other laws and regulations, and with the permission of a user, the remote network 106 may receive user data indicative of a user's emotional state. For example, the remote network 106 may analyze and identify a user's emotional state at a given time. For example, if the data capturing device 105 captures images of a user (e.g., video or still-frames), the remote network 106 may perform image recognition techniques to identify facial features, objects, body positions, and other data which may be used to indicate a user's emotional state. Image analysis techniques may identify whether a user is smiling, frowning, laughing, talking, or performing an action indicative of an emotion. Image analysis techniques may identify whether a user is looking in the direction of the device presenting content, whether a user is sitting or standing, whether a user's arms or hands are in a given position (e.g., raised in the air, covering a portion of the user's face, high-fiving another user, etc.). Heartrate monitors may measure a user's heartrate to determine whether a user is scared, excited, bored, or another emotion (e.g., a higher heartrate may indicate an excited or scared user). Biometric sensors may capture fingerprints, face recognition, blood flow, retinal data, voice data, scents, and other data which may be used by the remote network 106 to identify, individually or combination with other data, the user's emotional state.

In one or more embodiments, the remote network 106 may analyze the reactions of the user 102 to presented content, and may store data indicating which content is associated with causing certain emotions, how often, how long it takes the user 102 to transition from one emotion to another emotion, and other data. Emotional state data may be captured and indexed for an individual user and for multiple groups of users. For example, any individual may have an emotional profile stored and updated by a system based on the system's determination of emotions expressed by a user in response to different types and amounts of content. Emotional data may be stored and updated by a system to capture a general population and sub-populations (e.g., based on geography, demographics, etc.). The remote network 106 may use emotional state profiles to determine content likely to produce an emotional state given a user's individual emotional state data and/or emotional state data of a group of users.

In one or more embodiments, content providers may provide a system with content and timing information. The timing information may indicate times during presentation of content to cause an emotional state of one or more users. For example, the timing information may indicate that the content provider or another party intends to cause a user to be surprised at a first time, happy at a second time, and scared at a third time. The remote network 106 may determine, based on the user's current state, which content and/or what version or scale of the content to provide in order to evoke the target or desired emotional state.

In one or more embodiments, transitioning from a first emotional state to a second emotional state may take a different amount of time or may require different content than transitioning from a third emotional state to the second emotional state. For example, transitioning from happy to sad may be a more significant emotional transition than transitioning from angry to sad. Therefore, the remote network 106 may select and/or customize content differently to cause an emotion based on the current emotional state of a user.

In one or more embodiments, given the timing information and the difference between a user's current or recent emotional state and a desired emotional state, the remote network 106 may select or customize content to cause a transition. For example, the timing information may indicate to the system a time delta (e.g., an amount of time) for a user to reach an emotional state. The remote network 106 may analyze the user's current emotional state and the desired emotional state at a subsequent time (e.g., based on the timing information), and may determine an emotional delta function. The emotional delta function may be a function measuring how significant an emotional transition from a user's current emotional state to a desired emotional state may be given the amount of time to cause the desired emotional state. For example, an emotional delta function may indicate that an emotional transition from a first emotional state to a second emotional state is significant given the changes which may be required to cause the user's emotion to transition. The remote network 106 may measure the transition based on how different a facial expression indicative of the user's current emotion is from a facial expression indicative of a desired emotion. The remote network 106 may also determine whether a heartbeat, voice expression, body position, biometric data, or other data associated with a user is indicative of an emotional state, and may determine the difference between the data associated with a user's current emotional state and data associated with the desired emotional state. Based on how significant the differences are, the emotional delta function may be used by the remote network 106 to determine how significant the changes may be given the time required to effect an emotional state change. For example, with less time to cause an emotional state change, the emotional delta function may indicate that a more significant change in content may be needed to cause the desired emotional state change than when the system has more time to cause the desired emotional state change.

In one or more embodiments, the remote network 106 may determine, using the emotional delta function, whether the change from a user's current emotional state to a desired emotional state may be linear, exponential, logarithmic, or according to another pace. For example, to cause a linear change, the remote network 106 may select content which continuously causes a user to change emotional states. Such may include linearly increasing volume or changing pitch toward the desired volume or pitch, gradually adding characters over time, or other linear changes. To cause an exponential emotional state change, the remote network 106 may select content which may slowly change a user's emotional state before rapidly changing the user's emotional state (or the reverse). For example, to cause a scared emotional state when a user is playing a game in which a character enters a forest, the system may introduce a creature or two for a time, then may introduce an increasing number of creatures (e.g., in an exponential fashion) so that the user may be slightly scared at first, and exponentially increasingly scared over time as more creatures are introduced to the game. Similarly, content may be introduced or modified in a logarithmic fashion to cause a logarithmic change in a user's emotional state.

In one or more embodiments, the remote network 106 may identify content known to make a user or group of users exhibit an emotion (e.g., content which has produced a facial expression, heartrate, biometric output, or other user reaction) within a given amount of time from another emotional state, and may assign weights to the content. The weights may be heavier for content known to cause a reaction in a shorter or longer amount of time, or are known to cause a reaction to the user or a group of users having something in common with the user. The remote network 106 may identify multiple candidate artifacts based on a desired emotion, and may assign heavier weights to artifacts more likely to cause an emotion based on timing, a significance of a transition from one state to another, the user's past behavior, and the emotional delta function (e.g., to cause a linear, exponential, or logarithmic change).

In one or more embodiments, in an input state, a media creator may provide the remote network 106 with a set of potentially usable artifacts for the next available rendered frame of content. The media creator also may provide the remote network 106 with a desired emotional profile that the remote network 106 may use to attempt to cause the user to match (e.g., based on the user's reactions and expressions). Biometric feedback and other data may be provided to the remote network 106 to determine the user's emotional state. The media artifacts previously selected by the remote network 106 may be used to provide feedback on the performance of an artifact with respect to the artifact's success or failure in causing the desired emotional state within a given time.

In one or more embodiments, in a processing state, the remote network 106 may convert raw sensor data and other captured or input user data to a current user emotional profile using a selected facial machine learning system, which may include one or more neural networks and/or other machine learning devices and modules. Previously presented media artifacts may be paired with the change in emotional state and/or the current emotional state observed using received user data. The remote network 106 may determine a delta between the current emotional state and desired emotional state with respect to the delta function provided to the remote network 106 (e.g., by the content provider) to determine the desired emotional state that the next rendered frame is intended to cause. New tagged media artifacts may be selected and/or customized based on the updated artifact model and new desired emotional state. The remote network 106 may indicate to the media creators/providers which media artifacts were presented at given times and scenarios, and whether the presented media artifacts caused the desired emotional state changes.

Figure 2:
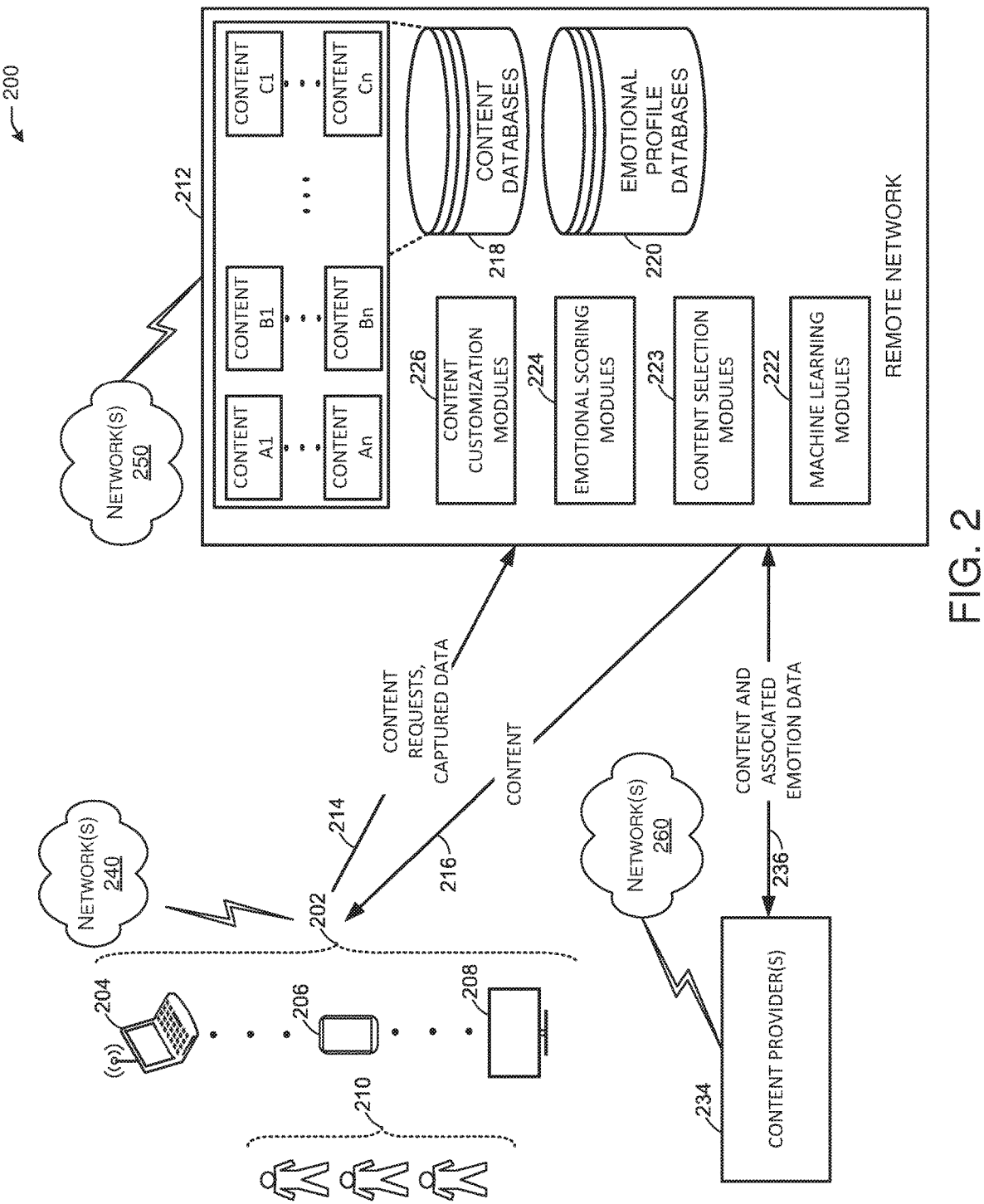
FIG. 2 illustrates an interactive emotion-based content system, in accordance with one or more example embodiments of the present disclosure.

FIG. 2 illustrates an interactive emotion-based content system 200, in accordance with one or more example embodiments of the present disclosure.

Referring to FIG. 2, the system 200 may include one or more user devices 202 (e.g., user device 204, user device 206, user device 208), which may display content to and interact with users 210. The users 210 may watch video using the one or more user devices 202, play games using the one or more user devices 202, listen to audio using the one or more user devices 202, and/or communicate with one another using the one or more user devices 202. The one or more user devices 202 may communicate with a remote network 212 to send content requests and/or captured data 214 (e.g., requests for video and/or audio content; captured data of one or more of the users 210, such as video, images, audio, biometric data, heartrate data, or other data permitted by the users 210). The remote network 210 may deliver content 216 to the one or more user devices 202 for presentation to the users 210.

Still referring to FIG. 2, the remote network 212 may include one or more content databases 218, one or more emotional profile databases 220, one or more machine learning modules 222, one or more content selection modules 223, one or more emotional scoring modules 224, and one or more content customization modules. The one or more content databases 218 may store content (e.g., content A1 . . . An, content B1 . . . content Bn, . . . , content C1 . . . content Cn), which may include video, audio, images, etc.) received by one or more content providers 234, which may send content and associated emotion data 236 (e.g., a target emotion state that the content is intended to cause the users 210 to express at given times). The one or more content providers 234 may limit which content is available from the one or more content databases 218 at a given time, and/or may limit the length of time that any content may be available for presentation or customization. The one or more content customization modules 226 may customize the content from the one or more content databases 218 (e.g., the one or more content customization modules 226 may customize content A1 by modifying a quantity, color, tint, brightness, sound, etc., resulting in content An). Content A1, content B1, and content C1, for example, may represent different content, which content A1 . . . content An may represent different versions of the same content (similarly content B1 . . . Bn may represent different versions of the same content, and content C1 . . . Cn may represent different versions of the same content).

In one or more embodiments, in accordance with relevant privacy and other laws and regulations, and with the permission of a user, the one or more user devices 202 may capture and send user data indicative of a user's emotional state (e.g., the captured data 214). For example, the one or more user devices 202 may include cameras, microphones, heartrate monitors, biometric sensors, other data capturing devices (e.g., the data capturing device 105 of FIG. 1), and inputs provided by the users 210 to analyze and identify a user's emotional state at a given time. A data capturing device for capturing user data may be a separate device from the one or more user devices (e.g., the data capturing device 105 of FIG. 1 may be separate from the device 104 of FIG. 1). For example, when a camera captures images of a user (e.g., video or still-frames), the one or more emotional scoring modules 224 may perform image recognition techniques to identify facial features, objects, body positions, and other data which may be used to indicate a user's emotional state. Image analysis techniques may identify whether a user is smiling, frowning, laughing, talking, or performing an action indicative of an emotion. Image analysis techniques may identify whether a user is looking in the direction of the device presenting content, whether a user is sitting or standing, whether a user's arms or hands are in a given position (e.g., raised in the air, covering a portion of the user's face, high-fiving another user, etc.). Heartrate monitors may measure a user's heartrate to determine whether a user is scared, excited, bored, or another emotion (e.g., a higher heartrate may indicate an excited or scared user). Biometric sensors may capture fingerprints, face recognition, blood flow, retinal data, voice data, scents, and other data which may be used to identify, individually or combination with other data, a user's emotional state.

In one or more embodiments, the one or more emotional scoring modules 224 may analyze expressions of the users and may determine a score indicative of a respective user's emotion or of the motion of a group of users. The score may be indicative of how happy, sad, excited, angry, bored, scared, or another emotion that a user or group of users may be. For example, a smile may indicate that a user is happy or laughing, and a frown may indicate that a user is angry or sad. Wide eyes of covering of a face may indicate shock or fear. Faster heartrate may indicate an excited or scared user. The one or more emotional scoring modules 224 may use computer-based image analysis techniques, translation of heartrate or biometric data, voice data, and other data received from the one or more user devices 202 with the permission of the users 210 to identify whether a user is engaged with content and/or expressing any particular emotion.

In one or more embodiments, the emotional state data of the users may be captured and indexed in the one or more emotional profile databases 220 for an individual user and for multiple groups of users. For example, any individual may have an emotional profile stored and updated based on the determination of emotions expressed by a user (e.g., as determined by the one or more emotional scoring modules) in response to different types and amounts of content. Emotional data may be stored and updated by the remote network 212 to capture a general population and sub-populations (e.g., based on geography, demographics, etc.). The remote network 212 may use emotional state profiles to determine content likely to produce an emotional state given a user's individual emotional state data and/or emotional state data of a group of users.

In one or more embodiments, the one or more content providers 234 may provide to the remote network 212 content (e.g., content A, content B) and associated emotion data. The emotion data may indicate times during presentation of content to cause an emotional state of one or more of the users 210. For example, the emotion data may indicate that a content provider or another party intends to cause a user to be surprised at a first time, happy at a second time, and scared at a third time. The one or more machine learning modules 222 may determine, based on a user's current state, which content and/or what version or scale of the content (e.g., content A vs. content A') to provide in order to evoke the target or desired emotional state. The emotion data may be represented by a graph or chart, which may indicate the amount of one or more target emotions to cause a user to express at given times and according to a type of progression (e.g., linear, exponential, logarithmic, etc.). For example, the emotion data may indicate a target emotion state in which a user is to be very excited and very scared, but only a little bit sad (e.g., an excited score of 50, a scared score of 30, and a sad score of 20, where the respective scores represent the levels or amounts of respective emotions). The emotion data may be represented by a chart or graph (e.g. a time series graph, pie chart, etc.) which indicates the levels of emotions targeted for respective emotion states (e.g., an emotion state may represent multiple levels of different emotions for a user to express). The one or more content providers 234 may receive feedback from the remote network 212 with regard a user's current emotion state at any time, and the one or more content providers 234 may adjust the emotion data to reflect different levels of emotion for a target emotion state. The emotion data may specify the specific amounts and/or types of emotions (e.g., jump scares, screams, tears, hand gestures, sounds, perspiration, etc.).

In one or more embodiments, transitioning from a first emotional state to a second emotional state may take a different amount of time or may require different content than transitioning from a third emotional state to the second emotional state. For example, transitioning from happy to sad may be a more significant emotional transition than transitioning from angry to sad. Therefore, the one or more machine learning modules 222 may select and/or customize content differently to cause an emotion based on the current emotional state of a user.

In one or more embodiments, given the emotion data and the difference between a user's current or recent emotional state and a target or desired emotional state, the one or more machine learning modules 222 and/or the one or more content selection modules 223 may select or customize content to cause a transition. The one or more machine learning modules 222 may select content, or the one or more content selection modules 223 may select content (e.g., using data from the one or more machine learning modules 222 or without the aid of the one or more machine learning modules 222). For example, the emotion data may indicate to the one or more machine learning modules 222 and/or the one or more content selection modules 223 a time delta (e.g., an amount of time) for a user to reach an emotional state. The one or more machine learning modules 222 and/or the one or more content selection modules 223 may analyze the user's current emotional state and the desired emotional state at a subsequent time (e.g., based on the emotion data), and may determine an emotional delta function. The emotional delta function may be a function measuring how significant an emotional transition from a user's current emotional state to a desired emotional state may be given the amount of time to cause the desired emotional state. For example, an emotional delta function may indicate that an emotional transition from a first emotional state to a second emotional state is significant given the changes which may be required to cause the user's emotion to transition. The one or more machine learning modules 222 and/or the one or more content selection modules 223 may measure the transition based on how different a facial expression indicative of the user's current emotion is from a facial expression indicative of a desired emotion. The one or more machine learning modules 222 and/or the one or more content selection modules 223 may also determine whether a heartbeat, voice expression, body position, biometric data, or other data associated with a user is indicative of an emotional state, and may determine the difference between the data associated with a user's current emotional state and data associated with the desired emotional state. Based on how significant the differences are, the emotional delta function may used to determine how significant the changes may be given the time required to effect an emotional state change. For example, with less time to cause an emotional state change, the emotional delta function may indicate that a more significant change in content may be needed to cause the desired emotional state change than when the system has more time to cause the desired emotional state change.

In one or more embodiments, the one or more machine learning modules 222 and/or the one or more content selection modules 223 may determine, using the emotional delta function, whether the change from a user's current emotional state to a target or desired emotional state may be linear, exponential, logarithmic, or according to another pace. For example, to cause a linear change, the one or more machine learning modules 222 and/or the one or more content selection modules 223 may select content which continuously causes a user to change emotional states. Such may include linearly increasing volume or changing pitch toward the desired volume or pitch, gradually adding characters over time, or other linear changes. To cause an exponential emotional state change, the one or more machine learning modules 222 and/or the one or more content selection modules 223 may select content which may slowly change a user's emotional state before rapidly changing the user's emotional state (or the reverse). For example, to cause a scared emotional state when a user is playing a game in which a character enters a forest, the one or more machine learning modules 222 and/or the one or more content selection modules 223 may introduce a creature or two for a time, then may introduce an increasing number of creatures (e.g., in an exponential fashion) so that the user may be slightly scared at first, and exponentially increasingly scared over time as more creatures are introduced to the game. Similarly, content may be introduced or modified in a logarithmic fashion to cause a logarithmic change in a user's emotional state.

In one or more embodiments, the one or more machine learning modules 222 and/or the one or more content selection modules 223 may function as one or more proportional integral derivative controllers (or some other type of controller), which may evaluate emotion states of users, the rates at which users are transitioning from one emotion state to another, and amounts of total emotions desired, and may select content for presentation to cause users to transition to target emotion states. The functions used to cause emotion state transitions through the selection of content for presentation may be revised based on monitoring of emotion states of users and determining whether those emotion states align with target emotion states and/or transitions between emotion states.

In one or more embodiments, the one or more machine learning modules 222 and/or the one or more content selection modules 223 may identify content known to make a user or group of users exhibit an emotion (e.g., content which has produced a facial expression, heartrate, biometric output, or other user reaction) within a given amount of time from another emotional state, and may assign weights to the content. The one or more machine learning modules 222 and/or the one or more content selection modules 223 may analyze the one or more emotional profile databases 220 to find respective emotional profiles of individual users or of the users 210. The emotional profiles may indicate the types of content which cause certain emotions of a user or group of users. For example, a user may be scared by zombies or ghosts, and the number of zombies or ghosts may correspond to how scared a user is, or the quantity may not matter. A user may be excited by certain colors, sounds, music, or costumes, and may be bored by or angry with other types of sounds, colors, backgrounds, characters, costumes, etc. The one or more machine learning modules 222 and/or the one or more content selection modules 223 may identify multiple candidate artifacts based on a target emotion indicated by the one or more content providers 234, and may assign heavier weights to artifacts more likely to cause an emotion based on timing, a significance of a transition from one state to another, the user's past behavior, and the emotional delta function (e.g., to cause a linear, exponential, or logarithmic change). The one or more machine learning modules 222 and/or the one or more content selection modules 223 may determine, using the emotional profiles, whether content and/or quantities of content are more or less likely to cause a reaction given a user's current emotional state. For example, one type or quantity of content may cause a user to be excited when the user is a given emotional state, but may have less impact on the user when the user is in another emotional state. The one or more machine learning modules 222 and/or the one or more content selection modules 223 may consider whether groups of users have expressed an emotion in response to a type or quantity of content, and may make content presentation decisions based on the individual emotional profiles and/or group emotional profiles.

In one or more embodiments, in a processing state, the one or more emotional scoring modules 224 may convert raw sensor data and other captured or input user data to a current user emotional profile using a selected facial machine learning system, which may include one or more neural networks and/or other machine learning devices and modules. Previously presented media artifacts may be paired with the change in emotional state and/or the current emotional state observed using received user data. The one or more machine learning modules 222 and/or the one or more content selection modules 223 may determine a delta between the current emotional state and target emotional state with respect to the delta function provided to the system (e.g., by the content provider) to determine the target emotional state that the next rendered frame is intended to cause. New tagged media artifacts may be selected and/or customized based on the updated artifact model and new target emotional state. The one or more machine learning modules 222 may indicate to the media creators/providers which media artifacts were presented at given times and scenarios, and whether the presented media artifacts caused the target emotional state changes.

In one or more embodiments, the one or more user devices 202 may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

The one or more user devices 202 may be configured to communicate via the communications network 240, wirelessly or wired. The remote network 212 may be configured to communicate via the communications network 250, wirelessly or wired. The one or more content providers 234 may be configured to communicate via the communications network 260. The communications network 240, communications network 250, and/or the communications network 260 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 240, the communications network 250, and/or the communications network 260 may have any suitable communication range associated therewith and may include, for example, global networks (e.g., the Internet), metropolitan area networks (MANs), wide area networks (WANs), local area networks (LANs), or personal area networks (PANs). In addition, the communications network 240, the communications network 250, and/or the communications network 260 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In one or more embodiments, the one or more machine learning modules 222 may be associated with a neural network (e.g., a convolutional neural network). The one or more machine learning modules 222 may include multiple layers. For example, a convolutional layer may include neurons to process data for a field. One or more layers may combine the outputs of neurons into a single neuron. The one or more machine learning modules 222 may determine outputs of neurons using a function that the one or more machine learning modules 222 learns by adjusting weights and input values of the function. For example, the human inputs may include annotations indicating areas of video frames exhibiting visible compression artifacts. The one or more machine learning modules 222 may receive human inputs indicating the correlation between user data, content presentation, and expressions. After being trained using the human inputs, the one or more machine learning modules 222 may train itself to identify content which is likely to cause a facial expression, biometric expression, heartrate, or other user output or behavior known to be associated with a target emotion state which presented content is intended to cause.

Figure 3A:
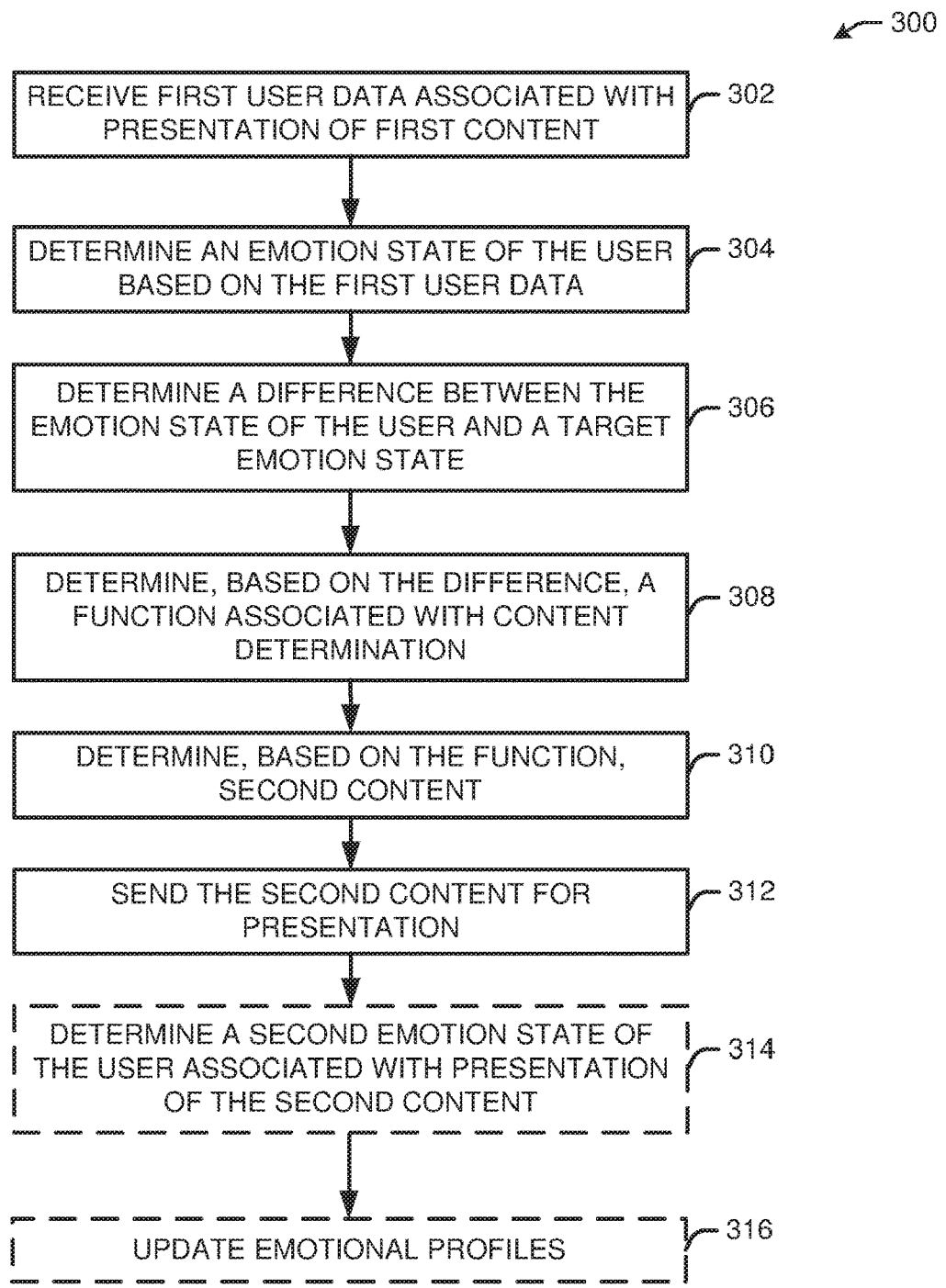
FIG. 3A illustrates a flow diagram for a process for using an interactive media emotion-based content system, in accordance with one or more example embodiments of the present disclosure.

FIG. 3A illustrates a flow diagram for a process 300 for using an interactive media emotion-based content system, in accordance with one or more example embodiments of the present disclosure.

At block 302, a device (e.g., the remote network 212 of FIG. 2) may receive first user data (e.g., captured data 214 of FIG. 2) associated with presentation of first content. For example, a user (e.g., a user of the users 210 of FIG. 2) may be watching, listening, and/or interacting with content presented on a device (e.g., the one or more user devices 202 of FIG. 2), and with user consent, the device or another device (e.g., a camera, microphone, biometric scanner, heartrate monitor, etc.) may capture (with user consent) video, images, audio, biometric data, heartrate data, or other data of a user while the user watches, listens to, interacts with (e.g., in a game) or otherwise consumes or witnesses presented content.

At block 304, the device may determine a first emotion state of the user based on the first user data. The device may analyze images of the user to identify the user's face, and may identify facial expressions of a user in an image based on facial characteristics exhibited by the user. For example, the device may identify based on pixel data of an image the location and shape of a user's mouth, and whether the user's mouth is in a shape or position indicative of a smile, frown, or grimace, is open or closed, or other positions which may indicate that a user is happy, sad, laughing, talking, frowning, or the like. The device may analyze heartrate data or biometric data, for example, to determine whether a user is excited or scared (e.g., a fast heartrate), subdued or bored (e.g., a slow heartrate), sweating, yelling, covering their face, high-fiving another user, etc. The device may determine a score for a respective emotion based on the user's expression and/or actions. For example, the device may determine a score indicating the likelihood that a user is happy, sad, scared, bored, excited, etc. The device may determine which expression or multiple expressions having the highest scores, or which expressions have scores higher than a threshold (e.g., whether a score indicates that a user likely is expression one or more emotions).

At block 306, the device may determine a difference between the first emotion state (e.g., an emotion with the score indicating the highest likelihood of the user exhibiting that emotion state compared to any other emotion state, or an emotion state with a score satisfying a score threshold) and a target emotion state. The device may receive (e.g., from the one or more content providers 234 of FIG. 2) data indicative of emotion states that a content provider or another party intends the user to express at a given time. For example, when presenting horror content, the target emotion state of a user may be scared or surprised. When a facial expression and/or other received user data indicates a face, heartrate, or biometric data known to be exhibiting fear or surprise, the device may determine that the user's first emotion state matches the target emotion state. When a facial expression and/or other received user data does not indicate a face, heartrate, or biometric data known to be exhibiting fear or surprise, the device may determine that the user's first emotion state does not match the target emotion, and may determine the difference between the user's first emotion state and the target emotion state (e.g., as indicated by a different in respective scores representing the amounts of emotions being represented). The target emotion state may specify different levels of and/or combinations of emotions (e.g., happy and excited, scared and excited, sad and angry, etc.), and/or may specify specific types of emotions (e.g., jump scares, screams, outbursts, closing or opening of the eyes, covering of the face, interaction with other users, etc.). The difference may indicate the difference between an amount of an emotion indicated by a user's current emotion state and an amount of the emotion indicated by the target emotion state. The target emotion may be known to be associated with certain facial expressions identified by facial characteristics identified in an image, and/or may be associated with a faster or slower heartrate, or certain biometric data. When the user's facial expression, heartrate, and/or biometric data does not match a facial expression, heartrate, and/or biometric data known to be associated with a particular emotion, the device may determine a difference between the facial expression for the target emotion state and the user's current facial expression, and/or a difference between a target user heartrate and the user's current heartrate, and/or a difference between a desired biometric output of the user and the user's current biometric output. In the context of facial expressions, the device may determine how significantly a user's facial expression would need to change to transition from a current facial expression to a target facial expression (e.g., using pixel analysis of images).

At block 308, the device may determine, based on the difference between the user's first emotion state and the target emotion state, a function associated with content determination. The function may measure how significant an emotional transition from the user's first emotion state to the target emotion state may be given an amount of time to cause the target emotional state (e.g., the amount of time to cause a transition from a happiness score of 25 to a happiness score of 75). For example, the function may indicate that an emotional transition from the first emotion state to the target emotional state is significant given the changes which may be required to cause the user's emotion to transition. Based on how significant the differences are, the function may be used to determine how significant the changes may be given the time required to effect an emotion state change. For example, with less time to cause an emotion state change, the function may indicate that a more significant change in content (e.g., a type of content or amount of content) may be needed to cause the target emotion state change than when the device has more time to cause the target emotional state change. The function may be based on historical user data (e.g., as indicated by emotional profiles). The historical user data may indicate how significant the transition may be for a user given the user's current emotion state.

At block 310, the device may determine, based on the function, and the desired emotion, second content to be presented to the user. When the amount of time to cause the emotion state transition is short and/or when the difference (e.g., based on pixel values, heartrate, and/or biometric data) between the first emotion state and the target emotion state is significant (e.g., when a frown must become a smile, when a heartrate must increase or decrease more than a threshold amount, etc.), the device may identify content known to cause the target expression in a short amount of time and/or transition from a particular emotion state, or known to be associated with an emotional score indicating a high likelihood of an emotion (e.g., a score of 100 out of 100 for causing a smile). The content may be different content than the content displayed when the user data was captured, or may include a different quantity or other type of alteration to the content displayed with the user data was captured. For example, if the target emotion state is fear and a the captured user data indicates that a user is not scared when a monster is presented, but emotional profile data indicates that the user is likely to be scared by monsters, the device may present additional monsters (e.g., adjusting the quantity). If monsters are not causing the user to exhibit any expressions or biometric data indicative of fear, the device may determine another type of content to present to the user, such as music known to be scary, a costume, a character, or a creature known to cause the desired emotional profile of the user. The selected content may address all of the different emotional levels and/or types of emotions associated with a target emotion state, or may address a portion of emotions and/or types. For example, the device may not identify content which can satisfy all of the levels of different emotions specified by a target emotion state within a given time, but may identify content that satisfies at least some of the emotional levels (e.g., the highest level emotions or emotions whose levels/scores exceed a respective threshold), or content that causes a specific type of emotion (e.g., a jump scare, scream or other sound, crying, etc.). The device may select multiple content artifacts, for example, to cause multiple target emotions for one user, or to cause emotions for different users (e.g., the same emotions of different users may be cause by different content artifacts, or the target emotion states of different users may be different, so the device may select content artifacts which are known to cause the respective target emotion states of different users).

At block 312, the device may send the second content to a user device for presentation. Sending the content may include sending quantity adjustments to currently presented content, making sound adjustments to the presented content, or presenting new video and/or audio content than what was presented when the user data was captured. Sending the content may include sending an indication or instruction that the second content is to be presented.

At block 314, the device may determine a second emotion state of the user associated with presentation of the second content to the user. With user consent, additional user data may be captured and analyzed to identify the user's second emotion state (e.g., similar to block 302 and block 304). At block 316, the device may update one or more emotional profiles (e.g., in the one or more emotional profile databases 220 of FIG. 2). When the second emotion state is a target emotion state, the device may update emotional profiles by indicating that the user and/or similar users (e.g., based on demographics, user preferences, etc.) may exhibit the target emotion state when the second content is presented. When the second emotion does not match a target emotion, the device may update emotional profiles by indicating that the second content is less likely than previously indicated by the emotional profiles to cause the target emotion state.

Figure 3B:
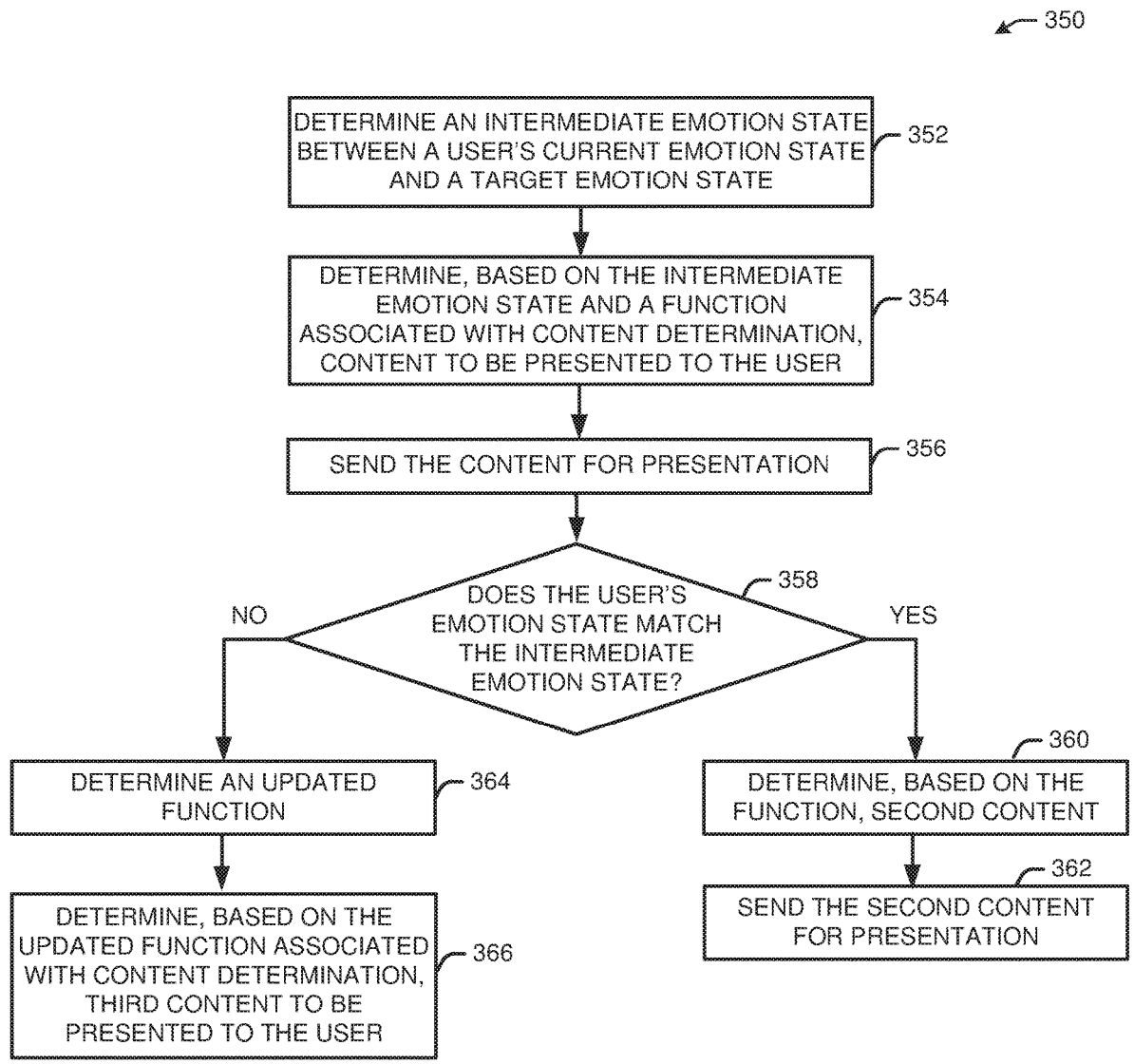
FIG. 3B illustrates a flow diagram for a process for using an interactive media emotion-based content system, in accordance with one or more example embodiments of the present disclosure.

FIG. 3B illustrates a flow diagram for a process 350 for using an interactive media emotion-based content system, in accordance with one or more example embodiments of the present disclosure.

At block 352, a device (e.g., the remote network 212 of FIG. 2) may determine an intermediate state between user's current emotion state (e.g., as determined at block 304 of FIG. 3A) and a target emotion state. The intermediate emotion state may be an emotion state from which the transition to the target emotion state requires less significant emotional change than the user's current emotion state. For example, if a function which defines target amounts of emotions (e.g., emotion scores) for one or more users to exhibit at certain times leading up to a target time (e.g., a scared score of 50 at time one, a scared score of 75 at time two, etc.) is used to select content for presentation to cause the target amounts of emotion, the intermediate emotion state may correspond to the emotion scores at the intermediate times (e.g., an intermediate emotion state may be the emotion state with the scared score of 50 at time one, and another intermediate emotion state may be the emotion state with the scared score of 75 at time two, and the target emotion state may include a scared score of 100 at time three).

At block 354, the device may determine, based on the intermediate emotion state and a function associated with content determination (e.g., a function as described at block 308 of FIG. 3A), content to be presented to the user. The content may be different content than the content displayed when the user data was captured, or may include a different quantity or other type of alteration to the content displayed with the user data was captured. For example, if the target emotion state is fear and a the captured user data indicates that a user is not scared when a monster is presented, but emotional profile data indicates that the user is likely to be scared by monsters, the device may present additional monsters (e.g., adjusting the quantity). If monsters are not causing the user to exhibit any expressions or biometric data indicative of fear, the device may determine another type of content to present to the user, such as music known to be scary, a costume, a character, or a creature known to cause the desired emotional profile of the user. The content may be known to cause the intermediate emotion state (e.g., a target intermediate emotion state), and/or the device may select the content because historical user data (e.g., emotional profile data) may indicate that the content is known to cause a transition from the user's current emotion state to an emotion state closer to the target emotion state. For example, when the user is frowning and the target emotion state is a smile, then the content may be selected because it may cause the user to be happier. When the user's heartrate is very low and the target heartrate is very high, the content may be known to cause a heartrate in between the current heartrate and the target heartrate.

At block 356, the device may send the content to a user device for presentation. Sending the content may include sending quantity adjustments to currently presented content, making sound adjustments to the presented content, or presenting new video and/or audio content than what was presented when the user data was captured. Sending the content may include sending an indication or instruction that the second content is to be presented.

At block 358, the device may determine whether the user's emotion state at a given time matches the intermediate emotion state (e.g., a target intermediate emotion state). For example, when the user's facial expression, heartrate, or biometric data matches or is within a threshold variation of a facial expression, heartrate, or biometric data known to be associated with the intermediate emotion state, the device may determine a match, and the process 350 may proceed to block 360. Otherwise, the process 350 may proceed to block 364. For example, a function used to select content to cause a user to transition from a current emotion state to a target emotion state may include levels or scores of intermediate target emotions for the user to express at times leading up to the target emotion state. The difference between a user's current emotion state and the intermediate emotion state may be represented by the difference in scores representing the level of one or more emotions (e.g., a sadness score of 50 for the current emotion state and a target intermediate emotion state sadness score of 60 may indicate a smaller difference than if the target intermediate emotion state sadness score is 75). If the difference is greater than a threshold difference, the process 350 may continue to block 364. The difference may be measured by a quantitative measurement of biometric data (e.g., a current heartrate and a target heartrate), and/or may be measured by data indicative of an expression (e.g., pixel data indicating a type of facial expression of a user captured by an image) and the difference between such data and data known to represent the target emotion state (e.g., the difference in pixel data between a facial expression captured in an image and the pixel data of a facial expression known to be associated with a target emotion state, such as the pixel differences between a frown and a smile in respective images).

At block 360, the device may determine second content based on the function. When an amount of time to cause the emotion state transition is short and/or when the difference (e.g., based on pixel values, heartrate, and/or biometric data) between the current emotion state and the intermediate emotion state is significant, the device may identify content known to cause the target emotion state in a short amount of time and/or transition from a particular emotion state, or known to be associated with an emotional score indicating a high likelihood of an emotion (e.g., a score of 100 out of 100 for causing a smile). The content may be different content than the content displayed when the user data was captured, or may include a different quantity or other type of alteration to the content displayed with the user data was captured. At block 362, the device may send the content for presentation or an indication that the content is to be presented.

At block 364, the device may determine an updated function to cause the user to transition to the target emotion state. The function may measure how significant an emotional transition from the user's current emotion state to the target emotion state may be given an amount of time to cause the target emotion state. For example, the function may indicate that an emotional transition from the first emotion state to the target emotional state is significant given the changes which may be required to cause the user's emotion to transition. Based on how significant the differences are, the function may be used to determine how significant the changes may be given the time required to effect an emotion state change. For example, with less time to cause an emotion state change, the function may indicate that a more significant change in content may be needed to cause the target emotion state change than when the device has more time to cause the target emotional state change. At block 366, the device may determine third content to be presented to the user and may send the third content or an indication of the third content. The third content may be content known to cause the target emotion state from the user's current emotion state. The third content may be known to cause a more significant transition to the target emotion state than the previously presented content which did not lead to a match of the intermediate emotion state.

Figure 4:
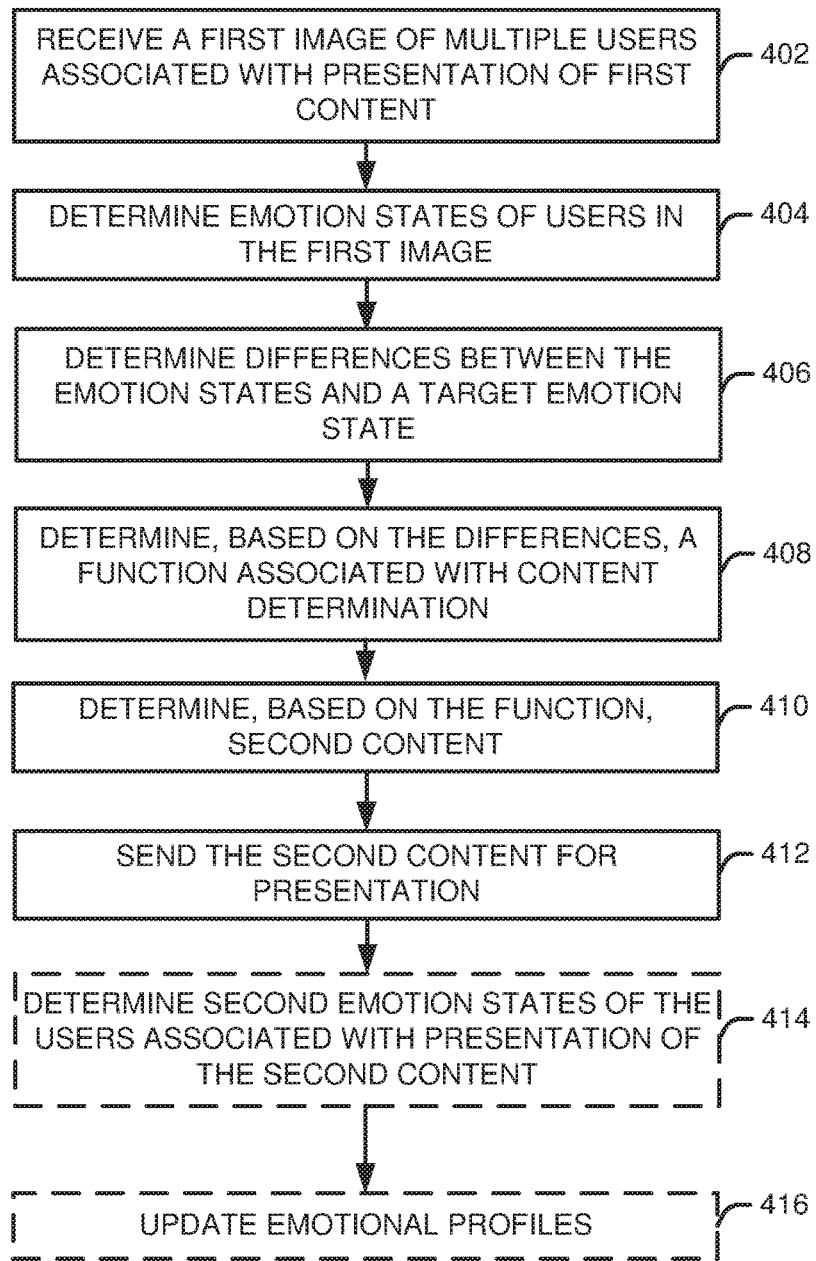
FIG. 4 illustrates a flow diagram for using an interactive media emotion-based content system adaptive multi-pass risk-based video encoding, in accordance with one or more example embodiments of the present disclosure.

FIG. 4 illustrates a flow diagram for a process 400 for using an interactive media emotion-based content system, in accordance with one or more example embodiments of the present disclosure.

At block 402, a device (e.g., the remote network 212 of FIG. 2) may receive a first image of multiple users (e.g., captured data 214 of FIG. 2) associated with presentation of first content. For example, users (e.g., the users 210 of FIG. 2) may be watching, listening, and/or interacting with content presented on a device (e.g., the one or more user devices 202 of FIG. 2), and with user consent, the device or another device (e.g., a camera, microphone, biometric scanner, heartrate monitor, etc.) may capture (with user consent) video, images, audio, biometric data, heartrate data, or other data of a user while the user watches, listens to, interacts with (e.g., in a game) or otherwise consumes or witnesses presented content.

At block 404, the device may determine emotion states of the users in the first image. The device may analyze the first image of the user to identify the users' faces, and may identify facial expressions of respective users in the first image based on facial characteristics exhibited by the users. For example, the device may identify based on pixel data of an image the location and shape of a user's mouth, and whether the user's mouth is in a shape or position indicative of a smile, frown, or grimace, is open or closed, or other positions which may indicate that a user is happy, sad, laughing, talking, frowning, or the like. The device may analyze heartrate data or biometric data, for example, to determine whether a user is excited or scared (e.g., a fast heartrate), subdued or bored (e.g., a slow heartrate), sweating, yelling, covering their face, high-fiving another user, etc. The device may determine a score for a respective emotion based on the user's expression and/or actions. For example, the device may determine a score indicating the likelihood that a user is happy, sad, scared, bored, excited, etc. The device may determine which expression or multiple expressions having the highest scores, or which expressions have scores higher than a threshold (e.g., whether a score indicates that a user likely is expression one or more emotions).

At block 406, the device may determine differences between emotion states of the users and a target emotion (e.g., based on emotion scores indicative of the levels of one or more emotions, or based on the differences between expressions in images or between biometric data). The target emotion may be known to be associated with certain facial expressions identified by facial characteristics identified in an image, and/or may be associated with a faster or slower heartrate, or certain biometric data. When the users' facial expressions, heartrates, and/or biometric data does not match a facial expression, heartrate, and/or biometric data known to be associated with a particular emotion, the device may determine a difference between the facial expression for the desired emotion and the users' current facial expression, and/or a difference between a target users' heartrate and the user's current heartrate, and/or a difference between a target biometric output of the user and the user's current biometric output. In the context of facial expressions, the device may determine how significantly a user's facial expression would need to change to transition from a current facial expression to a target facial expression (e.g., using pixel analysis of images). The device may determine the difference by comparing one user's expression (e.g., the most significantly different expression from the desired expression, the closest expression to the desired expression, or a median or average difference between the respective user expressions and the desired expression).

At block 408, the device may determine, based on the differences, a function associated with content determination. The function may measure how significant an emotional transition from the users' first emotion states to the target emotion state may be given an amount of time to cause the target emotional state. For example, the function may indicate that an emotional transition from the first emotion state to the target emotional state is significant given the changes which may be required to cause the users emotions to transition. Based on how significant the differences are, the function may be used to determine how significant the changes may be given the time required to effect an emotion state change. For example, with less time to cause an emotion state change, the function may indicate that a more significant change in content may be needed to cause the target emotion state change than when the device has more time to cause the target emotional state change. The function may be based on historical user data (e.g., as indicated by emotional profiles). The historical user data may indicate how significant the transition may be for a user given the user's current emotion state.

At block 410, the device may determine, based on the function, second content to be presented to the users. When an amount of time to cause the emotional transition is short and/or when the difference (e.g., based on pixel values, heartrate, and/or biometric data) between the first expression and the second expression is significant (e.g., when a frown must become a smile, when a heartrate must increase or decrease more than a threshold amount, etc.), the device may identify content known (e.g., to one or more of the identified user and/or to a general population or subset of a population associated with one or more of the users) to cause a desired expression in a short amount of time and/or transition from a particular emotional state, or known to be associated with an emotional score indicating a high likelihood of an emotion). The content may be different content than the content displayed when the user data was captured, or may include a different quantity or other type of alteration to the content displayed with the user data was captured. For example, if the desired expression is laughter and a the captured user data indicates that a user is not laughing when a character or comical sound is presented, but emotional profile data indicates that the users are likely to laugh when such characters or sounds are presented, the device may present additional characters or sounds (e.g., adjusting the quantity), or may change the costumes of the characters. If characters or sounds are not causing the user to exhibit any expressions or biometric data indicative of laughter, the device may determine another type of content to present to the user, such as objects, movements (e.g., character dances or gestures), scenes, etc. known to cause the desired emotional profile of the user. At block 416, the device may send the second content to a user device for presentation. Sending the content may include sending quantity adjustments to currently presented content, making sound adjustments to the presented content, or presenting new video and/or audio content than what was presented when the user data was captured. The selected content may address all of the different emotional levels and/or types of emotions associated with a target emotion state, or may address a portion of emotions and/or types. For example, the device may not identify content which can satisfy all of the levels of different emotions specified by a target emotion state within a given time, but may identify content that satisfies at least some of the emotional levels (e.g., the highest level emotions or emotions whose levels/scores exceed a respective threshold), or content that causes a specific type of emotion (e.g., a jump scare, scream or other sound, crying, etc.). The device may select multiple content artifacts, for example, to cause multiple target emotions for one user, or to cause emotions for different users (e.g., the same emotions of different users may be cause by different content artifacts, or the target emotion states of different users may be different, so the device may select content artifacts which are known to cause the respective target emotion states of different users).

At block 412, the device may send the second content to a user device for presentation. Sending the content may include sending quantity adjustments to currently presented content, making sound adjustments to the presented content, or presenting new video and/or audio content than what was presented when the user data was captured. Sending the content may include sending an indication or instruction that the second content is to be presented.

At block 414, the device may determine a second emotion states of the users associated with presentation of the second content to the users. With user consent, additional user data may be captured and analyzed to identify the users' second emotion state (e.g., similar to block 402 and block 404). At block 416, the device may update one or more emotional profiles (e.g., in the one or more emotional profile databases 220 of FIG. 2). When the second emotion state is a target emotion state, the device may update emotional profiles by indicating that the user and/or similar users (e.g., based on demographics, user preferences, etc.) may exhibit the target emotion state when the second content is presented. When the second emotion does not match a target emotion, the device may update emotional profiles by indicating that the second content is less likely than previously indicated by the emotional profiles to cause the target emotion state.

Figure 5:
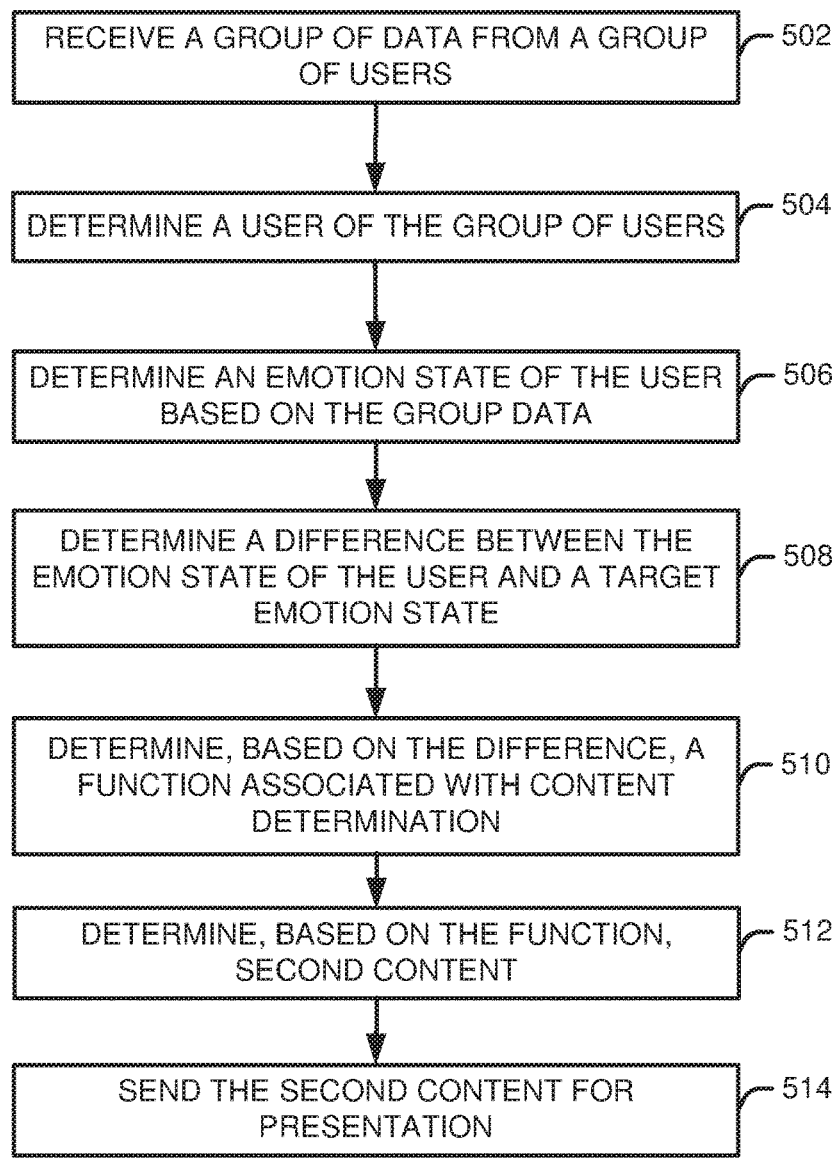
FIG. 5 illustrates a flow diagram for a process for using an interactive media emotion-based content system, in accordance with one or more example embodiments of the present disclosure.

FIG. 5 illustrates a flow diagram for a process 500 for identity-aware filtering with a proxy for virtual networks, in accordance with one or more example embodiments of the present disclosure.

At block 502, a device (e.g., the remote network 212 of FIG. 2) may receive data from a group of users (e.g., captured data 214 of the users 210 of FIG. 2) associated with presentation of first content. For example, users (e.g., the users 210 of FIG. 2) may be watching, listening, and/or interacting with content presented on a device (e.g., the one or more user devices 202 of FIG. 2). The content may include a first user's interaction with content (e.g., one or more users may be watching the first user playing a game). With user consent, the device or another device (e.g., a camera, microphone, biometric scanner, heartrate monitor, etc.) may capture (with user consent) video, images, audio, biometric data, heartrate data, or other data of a user while the user watches, listens to, interacts with (e.g., in a game) or otherwise consumes or witnesses presented content. The device therefore may receive different images, heartrate data, and/or biometric data of multiple respective users watching or interacting with the same content using different devices at different locations.

At block 504, the device may determine a user (e.g., one or more users) of the group of users whose user data to analyze. For example, if the first content includes presentation of one user playing a game, and other users are watching the user play, the device may determine to follow the user playing the game and/or the users watching the user play the game. If the content is a certain type of video, audio, or other form of content, the device may identify one or more users whose emotion states are to be determined for the purpose of selecting content for presentation to cause a target emotion state. The selection of one or more users to focus on for emotion state determination may be based on user preferences, how often users interact with content or are identified by the device, the type of content, user account status, or other criteria.

At block 506, the device may determine an emotion state of the user or users based on the group of user data. The device may analyze the respective images of the user and/or other user data to identify the users' faces, and may identify heartrates, biometric data, and/or facial expressions of respective users in the images based on facial characteristics exhibited by the users. For example, the device may identify based on pixel data of an image the location and shape of a user's mouth, and whether the user's mouth is in a shape or position indicative of a smile, frown, or grimace, is open or closed, or other positions which may indicate that a user is happy, sad, laughing, talking, frowning, or the like. The device may analyze heartrate data or biometric data, for example, to determine whether a user is excited or scared (e.g., a fast heartrate), subdued or bored (e.g., a slow heartrate), sweating, yelling, covering their face, high-fiving another user, etc. The device may determine a score for a respective emotion based on the user's expression and/or actions. For example, the device may determine a score indicating the likelihood that a user is happy, sad, scared, bored, excited, etc. The device may determine which expression or multiple expressions having the highest scores, or which expressions have scores higher than a threshold (e.g., whether a score indicates that a user likely is expression one or more emotions).

At block 508, the device may determine a difference between emotion state of the followed user and a target emotion (e.g., based on emotion scores indicative of the levels of one or more emotions, or based on the differences between expressions in images or between biometric data). The target emotion may be known to be associated with certain facial expressions identified by facial characteristics identified in an image, and/or may be associated with a faster or slower heartrate, or certain biometric data. When the emotional state does not match a facial expression, heartrate, and/or biometric data known to be associated with a particular emotion, the device may determine a difference between the facial expression for the desired emotion and the users' current facial expression, and/or a difference between a target users' heartrate and the user's current heartrate, and/or a difference between a target biometric output of the user and the user's current biometric output. The target emotion may be known to be associated with respective levels or scores of one or more types of emotions (e.g., a happiness score and a sadness score), and the difference may be based on the determined amounts of emotions associated with the captured user data and the scores indicating the levels of emotions associated with the target emotion score (e.g., a difference between a target excitement score of 100 and a user's determined current excitement score of 50). In the context of facial expressions, the device may determine how significantly a user's facial expression would need to change to transition from a current facial expression to a target facial expression (e.g., using pixel analysis of images). The device may determine the difference by comparing one user's expression (e.g., the most significantly different expression from the desired expression, the closest expression to the desired expression, or a median or average difference between the respective user expressions and the desired expression).

At block 510, the device may determine, based on the difference, a function associated with content selection/determination. The function may measure how significant an emotional transition from the current emotion state to the target emotion state may be given an amount of time to cause the target emotional state. For example, the function may indicate that an emotional transition from the first emotion state to the target emotional state is significant given the changes which may be required to cause the users emotions to transition. Based on how significant the differences are, the function may be used to determine how significant the changes may be given the time required to effect an emotion state change. For example, with less time to cause an emotion state change, the function may indicate that a more significant change in content may be needed to cause the target emotion state change than when the device has more time to cause the target emotional state change. The function may be based on historical user data (e.g., as indicated by emotional profiles). The historical user data may indicate how significant the transition may be for a user given the user's current emotion state.

At block 512, the device may determine, based on the function, second content to be presented to the users. When the amount of time to cause the emotional transition is short and/or when the difference (e.g., based on pixel values, heartrate, and/or biometric data) between the first expression and the second expression is significant (e.g., when a frown must become a smile, when a heartrate must increase or decrease more than a threshold amount, etc.), the device may identify content known (e.g., to one or more of the identified user and/or to a general population or subset of a population associated with one or more of the users) to cause a desired expression in a short amount of time and/or transition from a particular emotional state, or known to be associated with an emotional score indicating a high likelihood of an emotion). The content may be different content than the content displayed when the user data was captured, or may include a different quantity or other type of alteration to the content displayed with the user data was captured. For example, if the desired expression is laughter and a the captured user data indicates that a user is not laughing when a character or comical sound is presented, but emotional profile data indicates that the users are likely to laugh when such characters or sounds are presented, the device may present additional characters or sounds (e.g., adjusting the quantity), or may change the costumes of the characters. If characters or sounds are not causing the user to exhibit any expressions or biometric data indicative of laughter, the device may determine another type of content to present to the user, such as objects, movements (e.g., character dances or gestures), scenes, etc. known to cause the desired emotional profile of the user.

At block 514, the device may send the second content to a user device for presentation. Sending the content may include sending quantity adjustments to currently presented content, making sound adjustments to the presented content, or presenting new video and/or audio content than what was presented when the user data was captured. Sending the content may include sending an indication or instruction that the second content is to be presented.

Referring to FIGS. 3-5, the function may define whether the change from a user's current emotional state to a desired emotional state may be linear, exponential, logarithmic, or according to another pace. For example, to cause a linear change, the device may select content which continuously causes a user to change emotional states. Such may include linearly increasing volume or changing pitch toward the desired volume or pitch, gradually adding characters over time, or other linear changes. To cause an exponential emotional state change, the device may select content which may slowly change a user's emotional state before rapidly changing the user's emotional state (or the reverse). For example, to cause a scared emotional state when a user is playing a game in which a character enters a forest, the device may introduce a creature or two for a time, then may introduce an increasing number of creatures (e.g., in an exponential fashion) so that the user may be slightly scared at first, and exponentially increasingly scared over time as more creatures are introduced to the game. Similarly, content may be introduced or modified in a logarithmic fashion to cause a logarithmic change in a user's emotional state.

Still referring to FIGS. 3-5, when the device determines content adjustments or new content to present (e.g., block 310 of FIG. 3A, block 410 of FIG. 4, block 512 of FIG. 5), the device may consider an identified user's emotional profile (e.g., from the one or more emotional profile databases 220 of FIG. 2). Given a known user or an identified user (e.g., based on facial recognition of one or more images), the device may identify a user's emotional profile, which may indicate content that the user prefers and dislikes, and which content is known (e.g., based on historical data from analysis of the user's emotions given the presentation of different types and amounts of content) to cause the user to react a certain way (e.g., exhibit a facial expression, have a certain level or range or heartbeat, provide certain biometric data). An emotional profile may indicate how a user reacts to certain types of content in general, and specifically to certain types of content given a current emotional state, a time to transition, and/or an emotional delta function. For example, a user's emotional profile may indicate that a user is more likely to change from sad to happy when a first type of content is presented than a second type of content, or that a user transitions more quickly from happy to sad than from happy to angry. Given the types of content more likely to cause a reaction within an amount of time, the device may determine content to be presented to a user according to the target emotion states and times specified by a content provider.

Still referring to FIGS. 3-5, the target emotion state for a given time may be associated with content to be presented at the given time. The second content selected for presentation may be content presented to cause a transition from a user's current emotion state or users' current emotion states to the target emotion state according to the function. The device may determine content intended to cause the target emotion state of one or more users at a given time, and/or may determine content intended to cause one or more intermediate emotion states to facilitate the transition to a target emotion state.

Still referring to FIGS. 3-5, emotion states and target emotion states may be represented by scores for respective types of emotions. For example, an emotion state or target emotion state may be represented by the amounts of different types of emotions identified from captured user data. When captured user data is an image, for example, the image may be analyzed (e.g., by the one or more emotional scoring modules 224 of FIG. 2) for different levels of emotions expressed by a user. When a user is smiling, for example, the scores for happiness and excitement may be higher than the scores for sadness. A higher score may indicate a higher level of an emotion. The emotion state corresponding to the captured user data may be represented graphically (e.g., using a pie chart that indicates the different levels of emotions of a user). When a user's heartrate is high, the emotion state of the user may include a high score for excitement and/or fear. To determine the difference between a user's current emotion state and a target emotion state, the devices of FIGS. 3-5 may determine respective differences between the levels of emotions in the user's current emotion state and the target emotion state. For example, if a target emotion state indicates that a user should have a happiness score of 75 or above, and the current emotion state of the user indicates that the user is at a happiness level of 25, then the devices of FIGS. 3-5 may determine the difference between happiness scores of the current and target emotion states, and based on the difference (e.g., if the difference exceeds a threshold value), the devices may identify content which may cause the user to transition to the target emotion state according to the function. The more time that the function allows the devices of FIGS. 3-5 to cause the difference in emotions from the current emotion state to the target emotion state, the less aggressive the selected content may be (e.g., one monster may be presented instead of ten monsters to cause fear). The scores indicating levels of emotions may be associated with certain expressions. For example, a score of happiness may be indicated by a large smile on a user's face in an image. Therefore, when the target emotion state includes a high happiness score, and the user's current facial expression does not have a high happiness score (e.g., the user is not smiling), the devices of FIGS. 3-5 may determine the difference between current and target emotion states based on how different the current facial expression is (e.g., in terms of pixel changes) from a facial expression known to be associated with the target emotion state. Based on the difference between emotions in current and target emotion states and based on the amount of time that the devices have to cause the target emotion state, the devices may determine the function with which to identify content for presentation. For example, to transition from happy to sad may include a function representing the amount of time to cause a user to go from high happiness and low sadness scores to high sadness and low happiness scores. The function may represent the amount of transition between different levels of emotions over an amount of time. For example, when a user is to transition from a happiness score of 25 to a happiness score of 75, the function may identify increased levels of target happiness for the user at different times before the target time (e.g., a target happiness of 50 at one time, a target happiness of 60 at a later time, etc. until the user's happiness reaches the target emotion state with a happiness of 75). If a device has ten seconds to cause a transition from a happiness of 25 to a happiness of 75, for example, the function may indicate an aggressive transition (e.g., a happiness of 35 after three seconds, a happiness of 50 after five seconds, etc.), whereas if the device has a minute to cause a transition from a happiness of 25 to a happiness of 75, the function may indicate a less aggressive transition. A more aggressive transition may correspond to a more significant change in the type and/or amount of content than a less aggressive transition.

Figure 6:
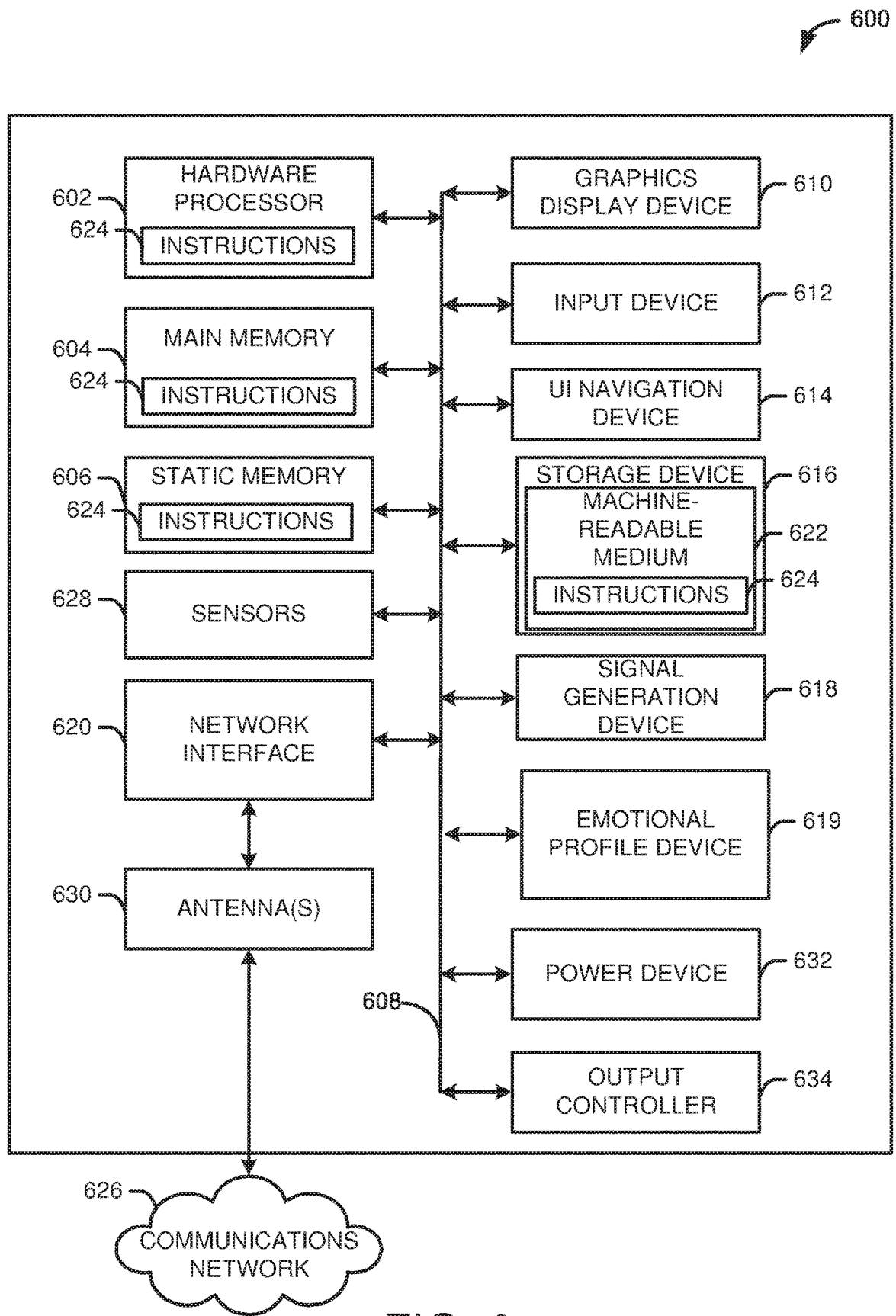
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the remote network 106 of FIG. 1, the remote network 212 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a server, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., an emitter, a speaker), an emotional profile device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The emotional profile device 619 may carry out or perform any of the operations and processes (e.g., process 300 of FIG. 3A, process 350 of FIG. 3B, process 400 of FIG. 4, process 500 of FIG. 5) described and shown above.

In one or more embodiments, the emotional profile device 619 may be implemented in a user device (e.g., the one or more user devices 202 of FIG. 2). When implemented on a user device which may present content provided by a remote network (e.g., the remote network 212 of FIG. 2), the emotional profile device 619 may receive user commands, such as content requests for video, audio, gaming, or other multimedia, and may facilitate the transmission of content requests to the remote network. The emotional profile device 619 may facilitate the capturing and transmission of user data, with user consent, for analysis by the remote network. For example, the emotional profile device 619 may include or be in communication with an image or video capturing device, a heartrate monitor, and/or one or more biometric sensors (e.g., sensors 628) to capture user data to be sent to the remote network for analysis.

In one or more embodiments, the emotional profile device 619 may be implemented in a remote network (e.g., the remote network 212 of FIG. 2). In accordance with relevant privacy and other laws and regulations, and with the permission of a user, the emotional profile device 619 may receive user data indicative of a user's emotional state. The emotional profile device 619 may perform image recognition techniques to identify facial features, objects, body positions, and other data which may be used to indicate a user's emotional state. Image analysis techniques may identify whether a user is smiling, frowning, laughing, talking, or performing an action indicative of an emotion. Image analysis techniques may identify whether a user is looking in the direction of the device presenting content, whether a user is sitting or standing, whether a user's arms or hands are in a given position (e.g., raised in the air, covering a portion of the user's face, high-flying another user, etc.). Heartrate monitors may measure a user's heartrate to determine whether a user is scared, excited, bored, or another emotion (e.g., a higher heartrate may indicate an excited or scared user). Biometric sensors may capture fingerprints, face recognition, blood flow, retinal data, voice data, scents, and other data which may be used to identify, individually or combination with other data, a user's emotional state.

In one or more embodiments, the emotional profile device 619 may analyze the reactions of users to presented content, and may store data indicating which content is associated with causing certain emotions, how often, how long it takes a user to transition from one emotion to another emotion, and other data. Emotional state data may be captured and indexed for an individual user and for multiple groups of users. For example, any individual may have an emotional profile stored and updated by a system based on the system's determination of emotions expressed by a user in response to different types and amounts of content. Emotional data may be stored and updated by a system to capture a general population and sub-populations (e.g., based on geography, demographics, etc.). The emotional profile device 619 may use emotional state profiles to determine content likely to produce an emotional state given a user's individual emotional state data and/or emotional state data of a group of users.

In one or more embodiments, content providers may provide the emotional profile device 619 with content and timing information/emotion data. The timing information/emotion data may indicate times during presentation of content to cause an emotional state of one or more users. For example, the timing information/emotion data may indicate that the content provider or another party intends to cause a user to be surprised at a first time, happy at a second time, and scared at a third time. The emotional profile device 619 may determine, based on a user's current state, which content and/or what version or scale of the content to provide in order to evoke the target emotional state.

In one or more embodiments, transitioning from a first emotional state to a second emotional state may take a different amount of time or may require different content than transitioning from a third emotional state to the second emotional state. For example, transitioning from happy to sad may be a more significant emotional transition than transitioning from angry to sad. Therefore, the emotional profile device 619 may select and/or customize content differently to cause an emotion based on the current emotional state of a user.

In one or more embodiments, given the timing information/emotion data and the difference between a user's current or recent emotional state and a target emotional state, the emotional profile device 619 may select or customize content to cause a transition. For example, the timing information/emotion data may indicate to the system a time delta (e.g., an amount of time) for a user to reach an emotional state. The emotional profile device 619 may analyze the user's current emotional state and the target emotional state at a subsequent time (e.g., based on the timing information/emotion data), and may determine an emotional delta function. The emotional delta function may be a function measuring how significant an emotional transition from a user's current emotional state to a desired emotional state may be given the amount of time to cause the target emotional state. For example, an emotional delta function may indicate that an emotional transition from a first emotional state to a second emotional state is significant given the changes which may be required to cause the user's emotion to transition. The emotional profile device 619 may measure the transition based on how different a facial expression indicative of the user's current emotion is from a facial expression indicative of a target emotion. The emotional profile device 619 may also determine whether a heartbeat, voice expression, body position, biometric data, or other data associated with a user is indicative of an emotional state, and may determine the difference between the data associated with a user's current emotional state and data associated with the target emotional state. Based on how significant the differences are, the emotional delta function may be used determine how significant the changes may be given the time required to effect an emotional state change. For example, with less time to cause an emotional state change, the emotional delta function may indicate that a more significant change in content may be needed to cause the target emotional state change than when the system has more time to cause the target emotional state change.

In one or more embodiments, the emotional profile device 619 may determine, using the emotional delta function, whether the change from a user's current emotional state to a target emotional state may be linear, exponential, logarithmic, or according to another pace. For example, to cause a linear change, the emotional profile device 619 may select content which continuously causes a user to change emotional states. Such may include linearly increasing volume or changing pitch toward the desired volume or pitch, gradually adding characters over time, or other linear changes. To cause an exponential emotional state change, the emotional profile device 619 may select content which may slowly change a user's emotional state before rapidly changing the user's emotional state (or the reverse). For example, to cause a scared emotional state when a user is playing a game in which a character enters a forest, the emotional profile device 619 may introduce a creature or two for a time, then may introduce an increasing number of creatures (e.g., in an exponential fashion) so that the user may be slightly scared at first, and exponentially increasingly scared over time as more creatures are introduced to the game. Similarly, content may be introduced or modified in a logarithmic fashion to cause a logarithmic change in a user's emotional state.

In one or more embodiments, the emotional profile device 619 may identify content known to make a user or group of users exhibit an emotion (e.g., content which has produced a facial expression, heartrate, biometric output, or other user reaction) within a given amount of time from another emotional state, and may assign weights to the content. The weights may be heavier for content known to cause a reaction in a shorter or longer amount of time, or are known to cause a reaction to the user or a group of users having something in common with the user. The emotional profile device 619 may identify multiple candidate artifacts based on a target emotion, and may assign heavier weights to artifacts more likely to cause an emotion based on timing, a significance of a transition from one state to another, the user's past behavior, and the emotional delta function (e.g., to cause a linear, exponential, or logarithmic change).

In one or more embodiments, in an input state, a media creator may provide the emotional profile device 619 with a set of potentially usable artifacts for the next available rendered frame of content. The media creator also may provide the system with a target emotional profile that the system may use to attempt to cause the user to match (e.g., based on the user's reactions and expressions). Biometric feedback and other data may be provided to the emotional profile device 619 to determine the user's emotional state. The media artifacts previously selected by the system may be used to provide feedback on the performance of an artifact with respect to the artifact's success or failure in causing the target emotional state within a given time.

In one or more embodiments, in a processing state, the emotional profile device 619 may convert raw sensor data and other captured or input user data to a current user emotional profile using a selected facial machine learning system, which may include one or more neural networks and/or other machine learning devices and modules. Previously presented media artifacts may be paired with the change in emotional state and/or the current emotional state observed using received user data. The emotional profile device 619 may determine a delta between the current emotional state and target emotional state with respect to the delta function provided to the system (e.g., by the content provider) to determine the target emotional state that the next rendered frame is intended to cause. New tagged media artifacts may be selected and/or customized based on the updated artifact model and new target emotional state. The emotional profile device 619 may indicate to the media creators/providers which media artifacts were presented at given times and scenarios, and whether the presented media artifacts caused the target emotional state changes.

It is understood that the above are only a subset of what the emotional profile device 619 may be configured to perform and that other functions included throughout this disclosure may also be performed by emotional profile device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   receiving an image of a user during presentation of first content to the user at a first time;
   determining a first facial expression of the user in the image;
   determining, based on the first facial expression, at a second time after the first time, a first emotion state of the user at the first time;
   determining a first desired emotion state to cause the user to have at a third time after the second time, wherein the first desired emotion state is associated with second content;
   determining a second desired emotion state to cause the user to have at a fourth time after the third time;
   determining a second facial expression associated with the first desired emotion state;
   determining a first amount of time from the second time to the third time, and during which to cause the user to transition from the first emotion state to the first desired emotion state;
   determining a second amount of time from the third time to the fourth time, and during which to cause the user to transition from the first desired emotion state to the second desired emotion state;
   determining, based on the first amount of time, a first function indicative of a first significance of the transition from the first emotion state to the first desired emotion state;
   determining, based on the second amount of time, a second function indicative of a second significance of the transition from the first desired emotion state to the second desired emotion state;
   selecting, based on the first function, third content to present to the user during the first amount of time, wherein the third content is different from the first content;
   determining, based on the function, an amount of the third content to present to the user; and
   selecting, based on the second function, fourth content to present to the user during the second amount of time.

2. The method of claim 1, wherein selecting the third content comprises determining, based on historical user data, that the third content is associated with the second facial expression.

3. The method of claim 1, further comprising:
   determining, based on the first function, a third facial expression; and
   determining, based on historical user data, that the third content is associated with the third facial expression, wherein selecting the third content is further based on the historical user data, and wherein the third content is to be presented to the user before presenting the second content.

4. A method, comprising:
   receiving user data associated with presentation of first content presented to a user at a first time;
   determining, at a second time after the first time, based on the user data, that the user had a first emotion state of a user at the first time;
   determining a first desired emotion state to cause the user to have at a third time after the second time;
   determining a second desired emotion state to cause the user to have at a fourth time after the third time, the second desired emotion state different than the first desired emotion state;
   determining a first amount of time from the second time to the third time, and during which to cause the user to transition from the first emotion state to the first desired emotion state;
   determining a second amount of time from the third time to the fourth time, and during which to cause the user to transition from the first desired emotion state to the second desired emotion state;
   determining, based on the first amount of time, a first function indicative of a first significance of the transition from the first emotion state to the first desired emotion state;
   determining, based on the second amount of time, a second function indicative of a second significance of the transition from the first desired emotion state to the second desired emotion state;

determining, based on the first function, second content to be presented to the user during the first amount of time; and determining, based on the second function, third content to be presented to the user during the second amount of time.

5. The method of claim 4, wherein the user data comprises an image of the user, wherein determining the first emotion state of the user comprises:

determining a first facial expression in the image; and determining that the first facial expression is associated with the first emotion state.

6. The method of claim 4, wherein the user data comprises audio of the user, and wherein determining the first emotion state of the user comprises determining that the audio is associated with the first emotion state.

7. The method of claim 4, wherein the user data comprises at least one of an image, heartrate data, voice data, or retinal data.

8. The method of claim 4, wherein the first emotion state comprises a first score associated with an emotion, wherein the first desired emotion state comprises a second score associated with the emotion, and wherein determining the first function further comprises determining a difference between the first score and the second score.

9. The method of claim 4, wherein the first desired emotion state is associated with fourth content, and wherein the second content is to be presented at a fifth time before the third time.

10. The method of claim 4, wherein the first content comprises a first video segment, wherein the second content comprises a second video segment, and wherein the first video segment is associated with a different scene than the second video segment.

11. The method of claim 4, further comprising:

determining, based on historical user data, that a first amount of the second content and a second amount of the second content are associated with the first desired emotion state; and determining that the first amount of the second content is more likely than the second amount of the second content to cause the first desired emotion state, wherein determining the second content comprises determining the first amount of the second content.

12. The method of claim 4, wherein the first content comprises audio, wherein determining the second content comprises changing a volume, tone, or pitch of the audio.

13. The method of claim 4, further comprising:

determining, based on the first function, a modification to apply to the first content presented to the user, the modification comprising at least one of a speed, a color, a brightness, or a volume, wherein determining the second content comprises applying the modification to the first content.

14. The method of claim 4, wherein the second desired emotion state is a negative emotion state.

15. The method of claim 4, wherein the first desired emotion state and the second desired emotion state are received from a same source as the first content presented to the user.

16. A device comprising memory coupled to at least one processer, the at least one processor configured to:

receive user data associated with presentation of first content to a user at a first time;

determine, at a second time after the first time, based on the user data, that the user had a first emotion state of a user at the first time;

determine a first desired emotion state to cause the user to have at a third time after the second time;

determine a second desired emotion state to cause the user to have at a fourth time after the third time;

determine a first amount of time from the second time to the third time, and during which to cause the user to transition from the first emotion state to the first desired emotion state;

determining a second amount of time from the third time to the fourth time, and during which to cause the user to transition from the first desired emotion state and the second desired emotion state;

determine, based on the first amount of time, a first function indicative of a first significance of the transition from the first emotion state to the first desired emotion state;

determine, based on the second amount of time, a second function indicative of a second significance of the transition from the first desired emotion state to the second desired emotion state;

determine, based on the first function, second content to be presented to the user during the first amount of time; and determine, based on the second function, third content to be presented to the user during the second amount of time.

17. The device of claim 16, wherein the user data comprises an image and biometric data.

18. The device of claim 16, wherein to determine the first function is further based on a difference between the third time and the first time.

19. The device of claim 16, wherein the first desired emotion state is associated with fourth content, and wherein the second content is to be presented at a fifth time before the third time.

20. The device of claim 16, wherein the at least one processor is further configured to:

determine, based on the function, a modification to apply to the first content presented to the user, the modification comprising at least one of a speed, a color, a brightness, or a volume, wherein to determine the second content comprises applying the modification to the first content.

* * * * *